(12) United States Patent
Baumgarte et al.

(10) Patent No.: US 8,960,656 B2
(45) Date of Patent: Feb. 24, 2015

(54) DEVICE FOR HANDLING WORKPIECES (75) Inventors: Rolf Baumgarte, Ahrensburg (DE); Frank Lewin, Tangstedt (DE); Michael Litzenberg, Geesthacht (DE); Michael Linke, Hamburg (DE)

(73) Assignee: KHS Corpoplast GmbH, Hamburg (DE)

( * ) Notice: Subject to any disclaimer, the term of this patent is extended or adjusted under 35 U.S.C. 154(b) by 402 days.

(21) Appl. No.: 13/505,247

(22) PCT Filed: Oct. 21, 2010

(86) PCT No.: PCT/DE2010/001248
§ 371 (c)(1),
(2), (4) Date: May 22, 2012

(87) PCT Pub. No.: WO2011/050781
PCT Pub. Date: May 5, 2011

(65) Prior Publication Data
US 2012/0223468 A1   Sep. 6, 2012

(30) Foreign Application Priority Data
Oct. 30, 2009   (DE) .................... 10 2009 051 656

(51) Int. Cl.
*B23Q 1/25*   (2006.01)
*B29C 49/42*   (2006.01)
*B29C 49/06*   (2006.01)
*B29C 49/36*   (2006.01)
*B29C 49/64*   (2006.01)
*B29K 67/00*   (2006.01)
*B29L 31/00*   (2006.01)
*B65G 47/86*   (2006.01)

(52) U.S. Cl.
CPC ............. B29C 49/4205 (2013.01); *B29C 49/06* (2013.01); *B29C 49/36* (2013.01); *B29C 49/6409* (2013.01); *B29K 2067/00* (2013.01); *B29L 2031/7158* (2013.01); *B65G 47/847* (2013.01)
USPC .................... 269/55; 269/58; 269/86; 269/87

(58) Field of Classification Search
USPC .......................................... 269/55, 58, 86, 97
See application file for complete search history.

(56) References Cited

U.S. PATENT DOCUMENTS

| 4,076,071 A | 2/1978 | Rosenkranz et al. |
| 5,346,386 A | 9/1994 | Albrecht et al. |
| 5,648,026 A | 7/1997 | Weiss |

(Continued)

FOREIGN PATENT DOCUMENTS

| DE | 2352926 | 4/1975 |
| DE | 3147285 A1 | 6/1983 |
| DE | 4212583 | 10/1993 |
| DE | 4340291 | 6/1995 |
| DE | 19906438 | 8/2000 |
| DE | 102007054388 | 5/2009 |

(Continued)

*Primary Examiner* — Lee D Wilson
*Assistant Examiner* — Shantese McDonald
(74) *Attorney, Agent, or Firm* — Lucas & Mercanti, LLP; Klaus P. Stoffel (57) ABSTRACT The device is used to retain workpieces, has a tong-like design, and is provided with two tong arms. The tong arms are retained by a tong base and can be arranged at least in an open position and in a closed position. The tong base is retained by a main element. When a specified actuating force is applied, the tong base is released and can be pivoted relative to the main element within a certain range. Respectively one movable counter-element is arranged adjacent to two lateral surfaces of the tong base. The counter-elements are retained in a starting position by means of at least one spring.

9 Claims, 9 Drawing Sheets

(56) References Cited

U.S. PATENT DOCUMENTS

| | | | |
|---|---|---|---|
| 5,711,411 A * | 1/1998 | Zurweller | 198/470.1 |
| 7,000,756 B2 * | 2/2006 | Wittmann et al. | 198/470.1 |
| 8,151,544 B2 | 4/2012 | Till et al. | |
| 2011/0203906 A1 * | 8/2011 | Fahldieck | 198/617 |

FOREIGN PATENT DOCUMENTS

| | | |
|---|---|---|
| DE | 102008055616 | 5/2010 |
| WO | 03068643 | 8/2003 |
| WO | 2008009410 | 1/2008 |
| WO | 2009059578 | 5/2009 |

* cited by examiner

DEVICE FOR HANDLING WORKPIECES

The present application is a 371 of International application PCT/DE2010/001248, filed Oct. 21, 2010, which claims priority of DE 10 2009 051 656.5, filed Oct. 30, 2009, the priority of these applications is hereby claimed and these applications are incorporated herein by reference.

BACKGROUND OF THE INVENTION

The invention relates to a device for holding workpieces which is constructed tong-like and is provided with two tong arms, wherein the tong arms are supported by a tong base and can be arranged in a controlled manner in at least one opening position and in a closed position, and wherein the tong base is held by a base element in such a way that the tong base is released once a predetermined adjustment force has been reached, and wherein the tong base is arranged so as to be pivotable at least over sections relative to the base element.

Moreover, the invention relates to a device for blow molding containers which includes at least one blow molding station with a blow mold and at least one support element for positioning preforms along a transport path. In this connection, it may be provided that the support element is held by a rotating transfer wheel relative to which the support element is movably mounted, and wherein a cam control is used for the support element.

When shaping containers by means of the influence of compressed air, preforms of a thermoplastic material, for example, preforms of PET (polyethylene terephthalate) are conveyed within a blow molding machine to different processing stations. Typically, such a blow molding machine includes a heating device as well as a blow molding device in whose areas the previously thermally conditioned preform is expanded into a container by biaxial orientation. The expansion takes place by means of compressed air which is conducted into the preform to be expanded. The process technological sequence of such an expansion of the preform is explained in DE-OS 43 40 291. The introduction of the pressurized gas mentioned in the above introduction also includes the introduction of the compressed gas into the developing container bubble as well as the introduction of the compressed gas into the preform at the beginning of the blow molding procedure.

The basic construction of a blow molding station for forming containers is described in DE-OS 42 12 583. Possibilities for thermally conditioning the preforms are explained in DE-OS 23 52 926.

Within the device for blow molding, the preforms, as well as the blow molded containers, can be transported by means of different handling devices. Particularly useful has been found the use of transport mandrels onto which the preforms are positioned. However, the preforms can also be handled by means of other support devices. The use of gripping tongs for handling preforms and the use of expanding mandrels, which can be inserted into an opening area of the preform, are also among the available constructions.

A manipulation of containers with the use of transfer wheels is described, for example, in DE-OS 199 06 438 in an arrangement of the transfer wheel, between a blow wheel and a discharge section.

The already explained manipulation of the preforms takes place, on the one hand, in the so-called two-stage methods, in which the preforms are initially manufactured in an injection molding process, are subsequently subjected to intermediate storage, and are only then later conditioned with respect to their temperature and blown up into a container. On the other hand, the so-called single-stage method is used, in which the preforms are immediately after their manufacture using injection molding technology and a sufficient solidification, thermally conditioned by suitable means and are subsequently blown up.

With respect to the blow molding stations used, different embodiments are known. In blow molding stations which are arranged on rotating transport wheels, a capability of opening of the mold carriers like a book is frequently found. However, it is also possible to use mold carriers which are slidable relative to each other or are guided in some other manner. In stationary blow molding stations, which are particularly suitable for receiving several cavities for the shaping of containers, typically plates arranged parallel to each other are used as mold carriers.

For the manipulation of the preforms and the manipulation of the blow molded containers, frequently so-called transfer wheels are used within the blow molding machine, wherein the transfer wheels are equipped, with support elements for the preforms or bottles. In this case, the support elements can either grasp the preforms or bottles directly, or convey separate transport elements which, in turn, hold the preforms or the bottles directly. For reinforcing the transfer procedures, the support elements are typically mounted so as to be pivotable relative to the transfer wheel. In addition, a telescoping capability is frequently also realized. Cam controls are used for presetting the position of the support elements. For this purpose, the support elements are guided with cam rollers along stationary cams.

A problem when using such transfer wheels provided with support elements resides in preventing heavy damage due to mechanical problems, particularly when collisions occur. For this purpose, it is known to mount the support arms with the use of overload couplings in the area of the transfer wheels. Such overload couplings are expensive, on the one hand, and, in addition, increase the structural weight of the rotating transfer wheels.

It is also already known to equip the support arms with active positioning elements which pneumatically or electrically preset an extension or retraction of the support arms such that the support arms are arranged in a work position or a position of rest. However, appropriate positioning devices result in relatively high costs and increase the structural weight of the transfer wheel, so that increased inertia properties occur.

Another problem in the use of tong-like support elements resides in the fact that the elements are relatively expensive and, when wear or mechanical damage makes it necessary to exchange the tongs, this requires correspondingly large work expenditure and attendant work costs.

While a tong-like support element is already described in DE 10 2007 054 388, which, under the influence of an overload, is held in the area of a support member so as to be deflectable, however, the respective construction has been found, taking into consideration the large number of required structural elements, to be expensive and, therefore, to only a limited extent, suitable for use in large quantities.

SUMMARY OF THE INVENTION

It is the object of the present invention to construct a device of the above mentioned type in such a way that with a simple structural configuration a high operational safety is reinforced.

In accordance with the invention, this object is met in that a counter element each is arranged adjacent to two side surfaces of the tong base, wherein the counter element is held by means of at least one spring in a basic position.

Consequently in accordance with the invention, tongs are made available which, when a predetermined load is exceeded, are arranged so as to be deflectable. In particular, it is intended that the tongs are actuated by a contact with the workpiece to be transferred or by a contact with a guide element. However, it is also possible to actively control the tongs. A combination of the properties of deflectability and a passive or active control makes available to those skilled in the art a novel functionality of holding tongs. A use can take place, for example, in blow molding machines for supporting preforms, bottles or transport elements or, in filling machines, for holding the containers to be filled.

The arrangement of the two counter elements next to the side surfaces of the tong base makes it possible, in the case of the occurrence of an overload, to facilitate pivoting of the tong base and to have pre-determinable forces act on the common base.

Kinematic border conditions can be taken into consideration in a simple manner by arranging the counter elements so as to be pivotable relative to the base element.

A minimum adjusting force can be preset by having a compression spring act on the counter elements.

Furthermore, it is also considered that the counter elements can be acted on by a tension spring.

A contribution to the compact and mechanically loadable construction is the fact that the spring is arranged with its longitudinal axis essentially transversely of a longitudinal axis of the base element.

A structurally simple construction is reinforced in that the side surfaces are essentially of plane construction.

Also contributing to an inexpensive manufacture is the fact that the side surfaces extend essentially parallel to each other.

Opening and closing movements of the tongs without being influenced by the counter elements are reinforced by the fact that ends of the counter elements extend in the direction of the longitudinal axis starting from the base element at most up to a plane which extends through a center line of an axis of rotation of the tong arm.

A connection of the individual parts without play is achieved in that the base element is clamped against a reference surface of the support arm.

A simple tong construction is achieved in that the tong arms are tensioned relative to each other by means of at least one spring.

A typical use resides in that the support element is fastened to a circumferentially extending conveying element.

For example, it is being considered to construct the conveying element as a chain.

Another field of application is made accessible by constructing the conveying element as a transfer wheel.

A preferred field of application resides in the fact that the tong base and the base element are constructed as part of a blow molding machine.

Among others, it is also being considered to construct the tong base and the base element as part of a blow molding module of a blow molding machine.

Furthermore, it is possible to construct the tong base and the base element as a part of a blow molding wheel of a blow molding machine.

A tong-like gripping function is reinforced by the fact that the tong arms of pivoting joints are arranged so as to be pivotable relative to the tong base.

DETAILED DESCRIPTION OF THE INVENTION

Figure 1:
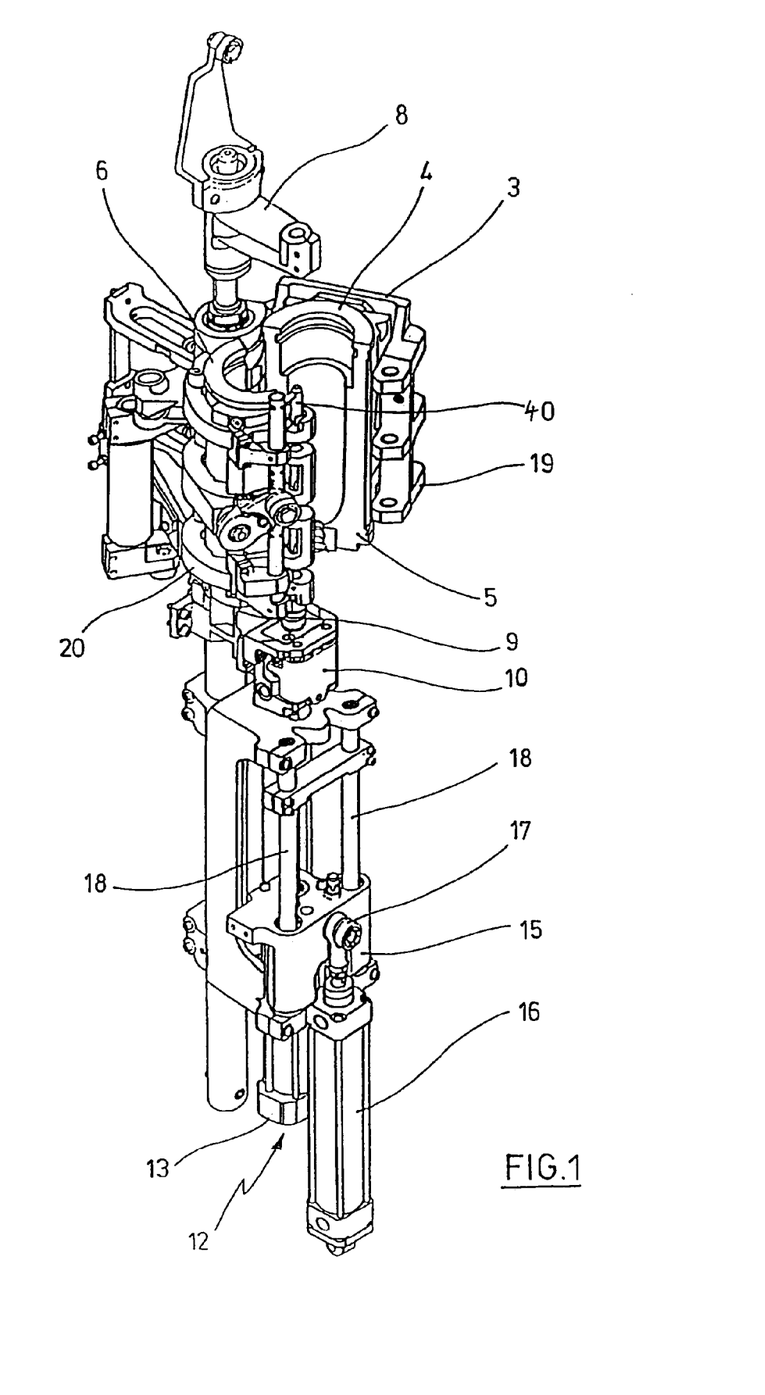
FIG. 1 is a perspective view of a blow molding station for manufacturing containers from preforms.
Figure 2:
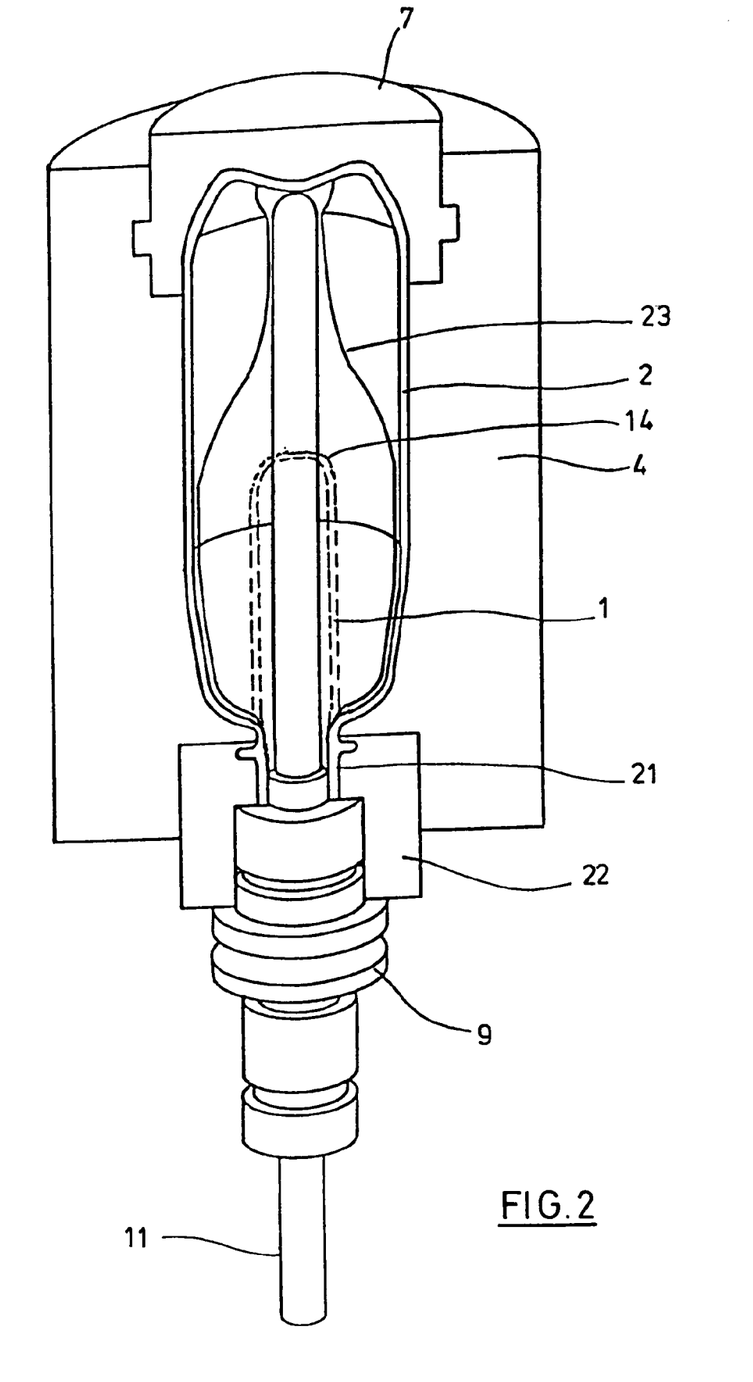
FIG. 2 is a longitudinal sectional view through a blow mold in which a preform is stretched and expanded.

The principal construction of a device for deforming preforms 1 into containers 2 is illustrated in FIG. 1 and in FIG. 2.

The device for forming the containers 2 consists essentially of a blow molding station 3 which is provided with a blow mold 4 into which a preform 1 can be placed. The preform 1 may be an injection molded part of polyethylene terephthalate. For facilitating a placement of the preform 1 into the blow mold 4 and for facilitating a removal of the finished container 2, the blow mold 4 consists of mold halves 5, 6 and a bottom part 7 which is positionable by a lifting device 8. The preform 1 can be held in the area of the blow molding station 3 by a transport mandrel 9 which, together with the preform 1, travels through a plurality of processing stations within the device. However, it is also possible to place the preform 1, for example, through tongs or other manipulating means, directly in the blow mold 4.

For facilitating a supply of compressed air, a connecting piston 10 is arranged underneath the transport mandrel 9, wherein the connecting piston 10 supplies compressed air to the preform 1 and simultaneously carries out sealing relative to the transport mandrel 9. However, in a modified construction, it is basically also conceivable to use fixed compressed air supply lines.

Stretching of the preform 1, takes place in this embodiment by means of a stretching rod 11 which is positioned by a cylinder 12. In accordance with another embodiment, a mechanical positioning of the stretching rod 11 is carried out by cam segments which are acted upon by sensing rollers. The use of cam segments is particularly useful when several blow molding stations 3 are arranged on a rotating blow wheel.

In the embodiment illustrated in FIG. 1, the stretching system is constructed in such a way that a tandem arrangement of two cylinders 12 is made available. From a primary cylinder 13, the stretching rod 11 is initially, prior to the beginning of the actual stretching procedure, moved into the area of a bottom 14 of the preform 1. During the actual stretching procedure, the primary cylinder 13 is positioned with extended stretching rod together with a carriage 15 supporting the primary cylinder 13 by a secondary cylinder 16, or is positioned through a cam control. In particular, it is intended to use the secondary cylinder 16 through a cam control in such a way that a guide roller 17, which while the stretching procedure is carried out slides along a cam track, pre-determines an actual stretching position. The guide roller 17 is pressed by the secondary cylinder 16 against the guide track. The carriage 15 slides along two guide elements 18.

After closing the mold halves 5, 6 arranged in the area of the carriers 19, 20, locking of the carriers 19, 20 relative to each other takes place by means of a locking device 20.

For adapting to different shapes of the opening section 21 of the preform 1, according to FIG. 2, the use of separate threaded inserts 22 is intended in the area of the blow mold 4.

FIG. 2 shows the blow molded container 2 in addition to the preform 1 in broken lines, as well as schematically shows the developing container bubble 23.

Figure 3:
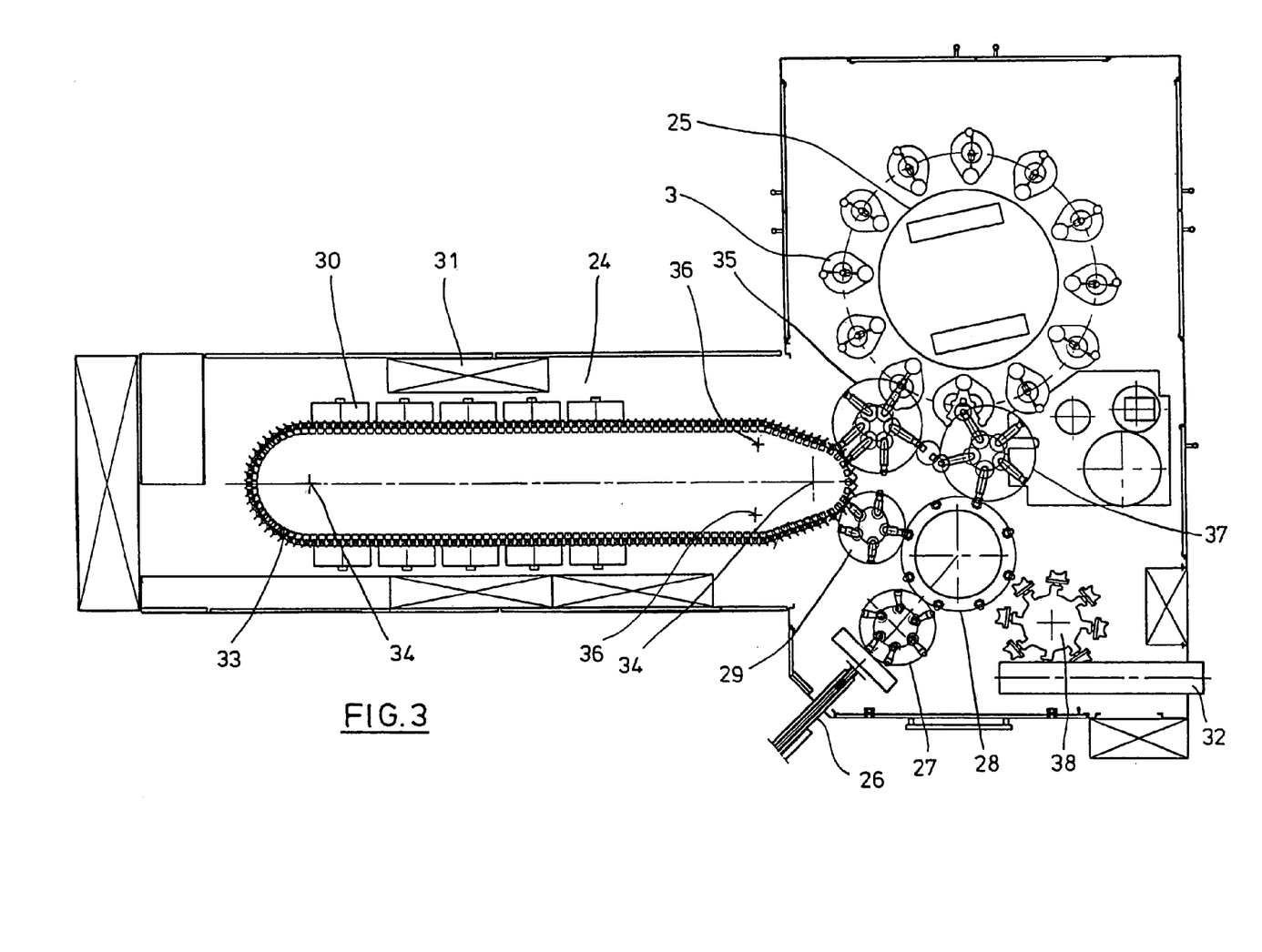
FIG. 3 is a sketch for illustrating a basic configuration of a device for blow molding containers.

FIG. 3 shows the basic construction of a blow molding machine which is provided with a heating section 24 as well as a rotating blow wheel 25. Starting from a preform input 26, the preforms 1 are transported by transfer wheels 27, 28, 29 into the area of the heating section 24. Along the heating section 24, heating radiators 30 as well as blowers 31 are arranged for conditioning the temperature of the preforms 1. After a sufficient temperature conditioning of the preforms 1 has been carried out, the preforms 1 are transferred to the blow wheel 25 in whose areas the blow molding stations 3 are arranged. The finished blow molded containers 2 are conveyed by additional transfer wheels to an output section 32.

In order to be able to deform a preform 1 in a container 2, in such a way that the container 2 has material properties which ensure a long usability of food stuffs filled into the container 2, particularly of beverages, special method steps must be used when heating and orienting the preforms 1. Moreover, advantageous effects can be obtained by maintaining special dimensioning rules.

Different synthetic materials can be used as thermoplastic material. For example, PET, PEN or PP can be used.

The expansion of the preform 1 during the orienting procedure takes place by compressed air supply. The compressed air supply is divided into a pre-blowing phase in which gas, for example, compressed air, is supplied with a low pressure level and into a subsequent principal blowing phase in which the gas is supplied with a higher pressure level. During the pre-blowing phase, typically compressed air having a pressure in the interval of 10 bar to 25 bar is used and during the principal blowing phase compressed air with a pressure in the interval of 25 bar to 40 bar is supplied.

From FIG. 3 it also can be seen that in the illustrated embodiment the heating section 24 is formed of a plurality of circumferentially travelling transport elements 33 which are arranged in a row in the manner of a chain and are guided along by guide wheels 34. In particular, it is intended to set up, by the chain-like arrangement, an essentially rectangular basic contour. In the illustrated embodiment, in the area of the extension of the heating section 24, facing the transfer wheel 29 and an input wheel 35, a single deflection wheel 34 having relatively large dimensions, and in the area of adjacent deflections, deflection wheels 36 having relatively small dimensions are used. However, basically all other kinds of guidance are conceivable.

For facilitating an arrangement of the transfer wheel 29 and the input wheel 35 as close as possible, the illustrated arrangement has been found to be particularly useful because in the area of the corresponding extension of the heating section 24, three deflection wheels 34, 36, are positioned, namely the respectively smaller deflection wheels 36 in the area of the transfer to the linear paths of the heating section 24, and the larger deflection wheel 34, in the immediate transfer area to the transfer wheel 29 and to the input wheel 35. As an alternative to the use of chain-like elements 33 it is, for example, also possible to use a rotating heating wheel.

After blow molding of the containers 2 has finished, the containers 2 are guided by a removal wheel 37 out of the area of the blow molding stations 3 and through the transfer wheel 28 and a discharge wheel 38 to the discharge section 32.

Figure 4:
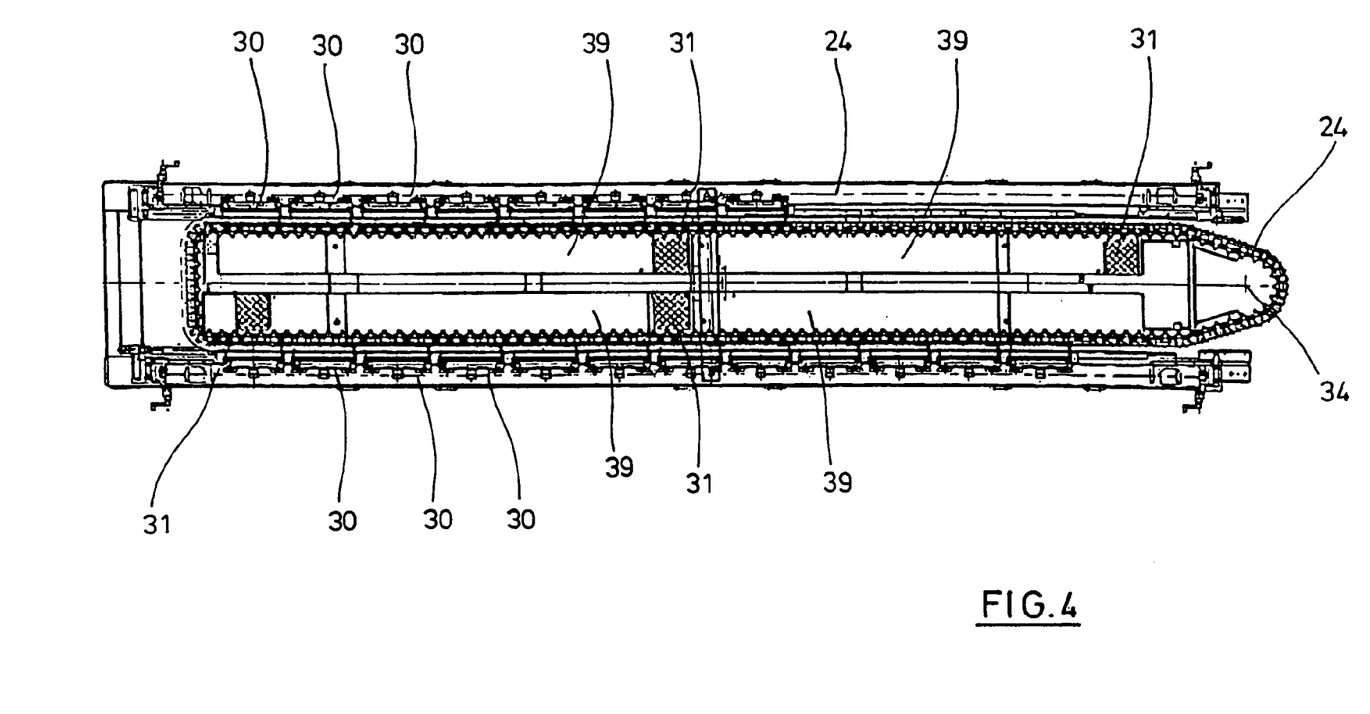
FIG. 4 shows a modified heating section with enlarged heating capacity.

In the modified heating section 24 illustrated in FIG. 4, the larger number of heating radiators 30 make it possible to thermally condition a larger number of preforms 1 per unit of time. The blowers 31 conduct, in this case, cooling air into the area of cooling air ducts 39, which are each located opposite the respective heating radiators 30, and discharge the cooling air through outlet openings. By the arrangement of the outlet directions, a flow direction for the cooling air is realized essentially transversely of a transport direction of the preforms 1. The cooling air ducts 39 can make available reflectors for the heating radiation in the area of surfaces located opposite the heating radiators 30; it is also possible to realize cooling of the heating radiators 30 by means of the discharged cooling air.

Figure 5:
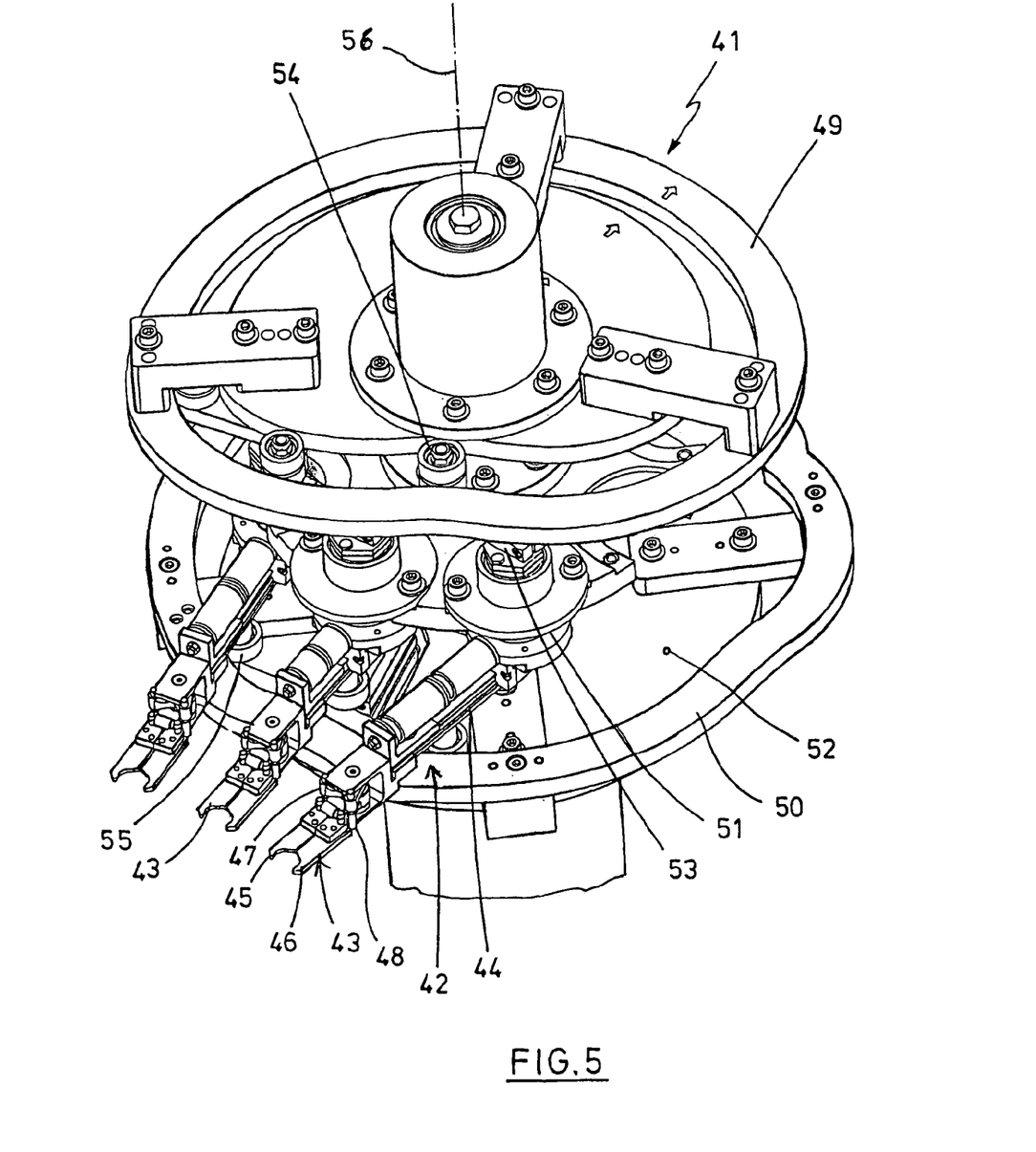
FIG. 5 is a perspective view of a transfer wheel with a plurality of positionable support arms.

FIG. 5 shows a transfer wheel 41 which can be mounted, for example, in the positions for at least one of the transfer wheels 27, 28, 29. The transfer wheel 41 is provided with support elements 42 which serve for manipulating preforms 1 and/or containers 2. In the illustrated embodiment, the support element 42 is formed of a manipulating element 43 and a support arm 44. The manipulating element 43 is in the illustrated embodiment constructed tong-like and has two tong arms 45, 46 which are mounted so as to be moveable by a tong base 47. The tong base 47 can be locked in a base element 48 which is held by support arm 44. Such manipulating elements 43 directly grasp the preforms 1 or containers 2. However, the manipulating elements 43 can also be realized in such a way that a contact with transport elements is provided, which, in turn, support the preforms 1 or containers 2. Such a transport element can be realized, for example, as a transport mandrel 9 onto which the preforms 1 can be placed, or into which the preforms 1 can be inserted with their opening areas.

FIG. 5 shows that for controlling the positioning movements of the support elements 42, two cam tracks 49, 50 are used which are arranged one above the other in the vertical direction. The support arms 44 are fastened through pivoting joints 51 at a central element 52 of the transfer wheel 41. In the area of the pivoting joints 51, the support arms 44 have transverse levers 53 which are guided through a cam roller 54 along the cam track 49. This causes pivoting movements of the support arms 44 to be preset when a rotation of the central element 52 occurs. In the illustrated embodiment, the cam rollers 54 are guided on the inner side along the cam track 49.

The support arms 44 are constructed so as to be telescoping and are guided with the use of a cam roller 55 along the cam track 50 in order to preset a telescoping movement of the support arm 44. In the illustrated embodiment, the cam roller 55 is also guided in the inner side along the cam track 50. In a typical operating sequence, the transfer wheel 41 rotates about its axis of rotation 56.

Figure 6:
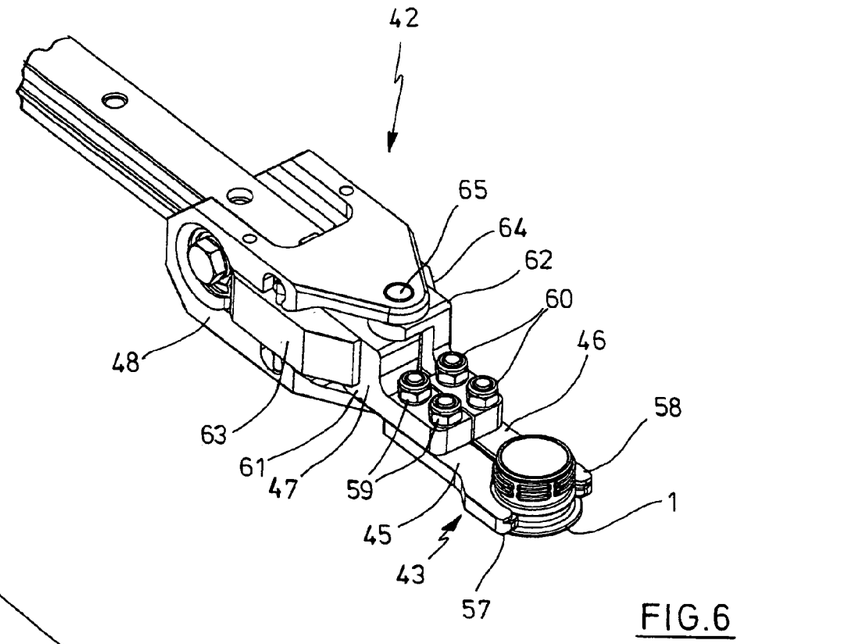
FIG. 6 is a perspective view of a tong-like holding element in a closed state of the tongs.

FIG. 6 shows in a perspective illustration the construction of the base element 48 and the tong base 47 with the tong arms 45, 46. It can be seen that the tong arms 45, 46 have gripping ends 57, 58 which may be constructed for partially enclosing a neck area of a preform 1 or of a container 2. The tong arms 45, 46 are connected through connecting elements 59, 60 to the tong base 47.

FIG. 6 also shows that, adjacent to side surfaces 61, 62 of the tong base 47, counter elements 63, 64 are arranged. Also shown is an axis of rotation 65 around which the tong base 47 is arranged so as to be pivotable relative to the base element 48.

In the state of operation according to FIG. 6, the tong arms 45, 46 grasp with their gripping ends 57, 58 the preform 1 or a container 2.

Figure 7:
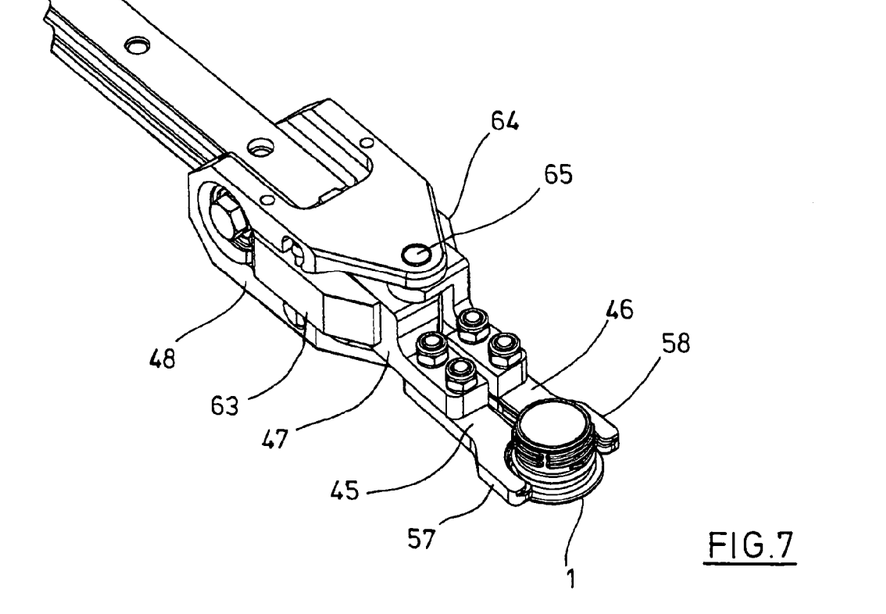
FIG. 7 shows the arrangement of FIG. 6 in an open state of the tongs.

FIG. 7 shows the arrangement according to FIG. 6 in an open state of the tongs. The tong arms 45, 46 have been moved slightly apart from each other so that the gripping ends 57, 58 release the preform 1 or the container 2.

Figure 8:
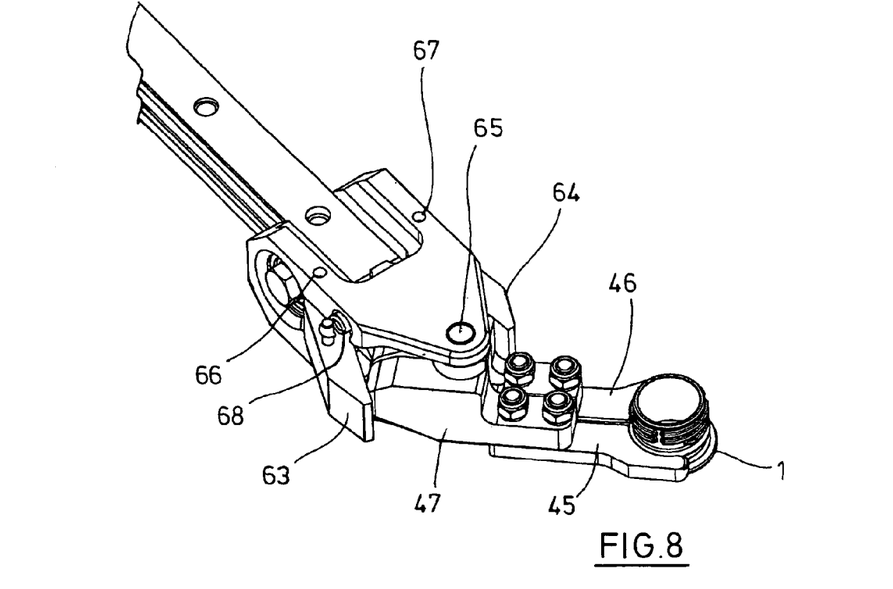
FIG. 8 shows the arrangement according to FIG. 6 and FIG. 7 after a deflection of the tong base relative to the base element.

FIG. 8 shows a state of operation of the tongs in which the tong base 47 is deflected relative to the base element 48. This typically takes place as the consequence of an introduction of an overload. The tong base 47 is then pivoted about the axis of rotation 65. It can be seen that the counter elements 63, 64 are arranged so as to be pivotable around the axis of rotation 65. It can be seen that the counter elements 63, 64 are arranged so as to be pivotable around the axes of rotation 66, 67. As a consequence, the tong base 47 can position the counter elements 64, 64 when carrying out a compensating movement. The counter elements 64, 64 are tensioned by a spring 68 in such a way that the counter elements 63, 64 are guided into the basic positions illustrated in FIG. 6 and FIG. 7. A deflection of the tong base 47 takes place as a result against the force of the spring 68.

Figure 9:
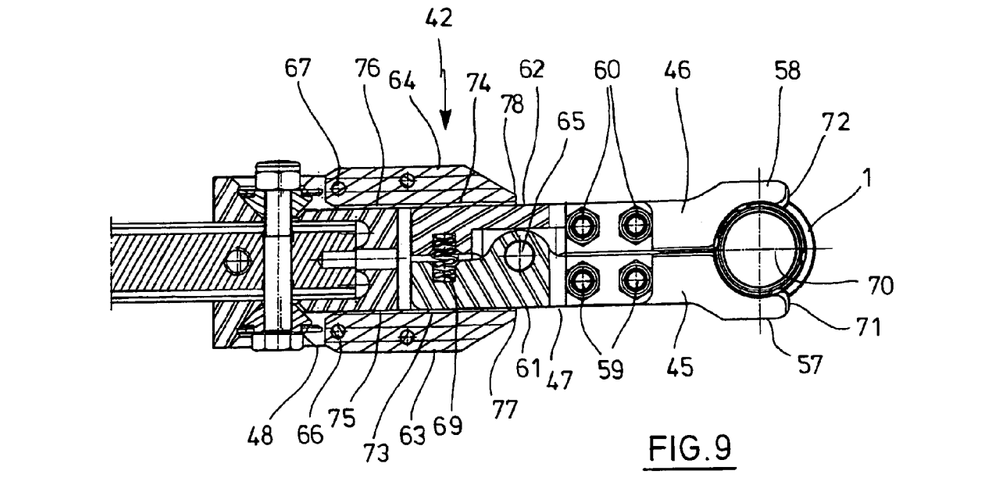
FIG. 9 is a horizontal sectional view of the arrangement according to FIG. 6.

FIG. 9 shows a horizontal sectional view of the arrangement of FIG. 6. The preform 1 or a container 2, not illustrated in the drawing, are grasped by the gripping ends 57, 58 of the tong arms 45, 46 and are contacted preferably above a support ring. In the illustrated embodiment, the tong arms 45, 46 are supported relative to each other by a spring 69. The spring is preferably arranged transversely of a longitudinal axis 70 of the support element 42. Also, preferably a construction as a compression spring is available.

The spring 69 is positioned at a distance from the axis of rotation 45 and in an area of the tong arms 45, 46 facing away from the gripping ends 57, 58. This makes it possible to press the gripping ends 57, 58 against the preform 1 or the container 2 and remain without an external influence in this state. Thus, the present construction is especially suitable for forming a tong without external active actuating elements. For facilitating an insertion of the preform 1 or the container 2 between the gripping ends 57, 58, the latter can be provided with rollers 71, 72 in order to avoid frictional forces. By means of a suitable guidance, the preform 1 or the container 2 can thus be simply pressed between the gripping ends 57, 58 or, in the case of an influence of a suitable force, is once again released from the gripping ends.

In the basic state according to FIG. 9 the counter elements 63, 64 rest with guide surfaces 73, 74 against the side surfaces 61, 62 of the tong arms 45, 46. Also, the counter elements 63, 64 rest with their guide surfaces 73, 74 against stop surfaces 75, 76 of the basic element 48 and are tensioned against these stop surfaces 75, 76 by the spring 68 which is not visible in FIG. 9. Based on the contact of the guide surfaces 73, 74 with the stop surfaces 75, 76 the position of the counter elements 63, 64 is precisely preset in this basic state. Based on the contact between the guide surfaces 73, 74 and the side surfaces 61, 62 which is also present, the positioning of the tong face 47 is exactly preset. Accordingly, no additional locking engagement is required for the definition of a basic state.

Figure 10:
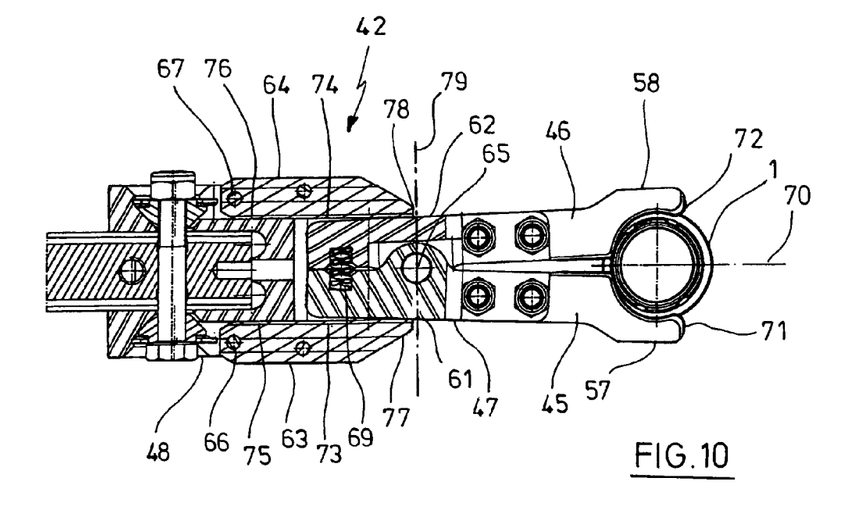
FIG. 10 is a horizontal sectional view of the arrangement according to FIG. 7, FIG. 11 a horizontal sectional view of the arrangement according to FIG. 8.

FIG. 10 shows the carrier element 42 in the state of operation according to FIG. 7 and in a horizontal sectional view as illustrated in FIG. 9. In this case, the gripping ends 57, 58 of the tong arms 45, 46 are spread apart from each other and release the preform 1. As a result, the tong arms 45, 46 are pivoted about the axis of rotation 45 and compress the spring 69.

From FIG. 10 it can be seen that ends 77, 78 of the counter elements 63, 64 are arranged facing away from the axes of rotation area arranged approximately on a level of a center line 79 of the axis of rotation 65. This ensures that the counter elements 63, 64 are not pressed apart when the tong arms 45, 46 are opened, while simultaneously in the area of the ends 77, 78 a guidance of the tong arms 45, 46, for maintaining the basic position of the tong base 47, is carried out.

Figure 11:
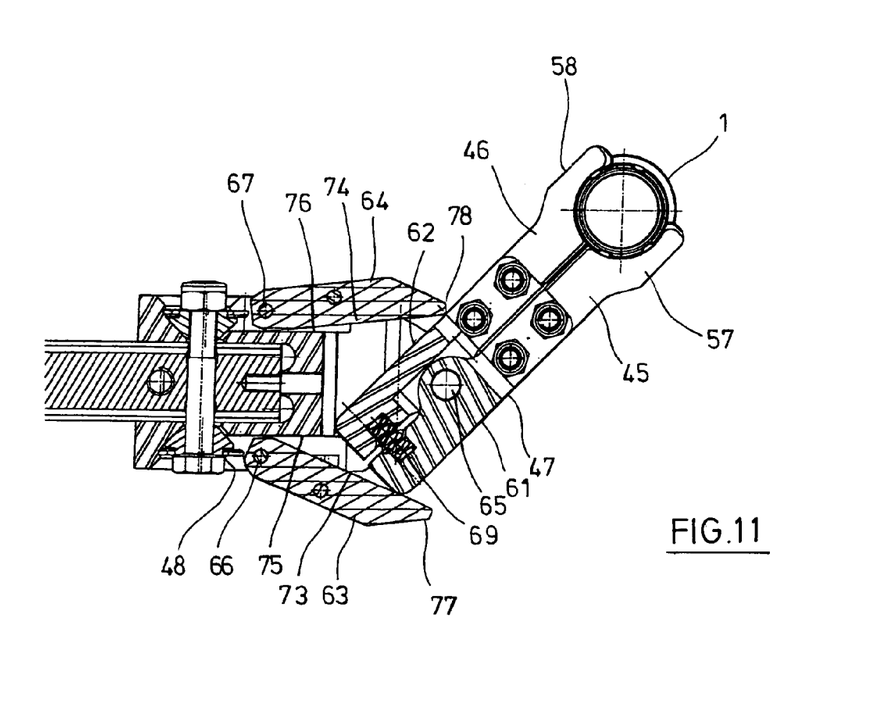

FIG. 11 shows a horizontal sectional view of the state of operation of the carrier element 42 in accordance with FIG. 8. In this case, the tong base 47 is pivoted about the axis of rotation 65 as a consequence of the influence of an overload and presses the counter elements 63, 64 apart. The counter elements 63, 64 are here pivoted against the force of the spring 68, which is not visible in FIG. 11, about the axes of rotation 66, 67.

In accordance with the construction illustrated in FIG. 11, it is intended that the tong base 47 is not fixed in the outwardly pivoted positioning, which basically also would be possible. Rather, in the illustrated embodiment, the tong base 47 is acted upon by the counter elements 63, 64 with a force in such a way that after the conclusion of the influence of the interfering force caused by the deflection, the tong base returns automatically back into the basic position. Consequently, in the case of an interference which acts only for a short period of time, a state capable of operation is once again reached without requiring any external influences.

Figure 12:
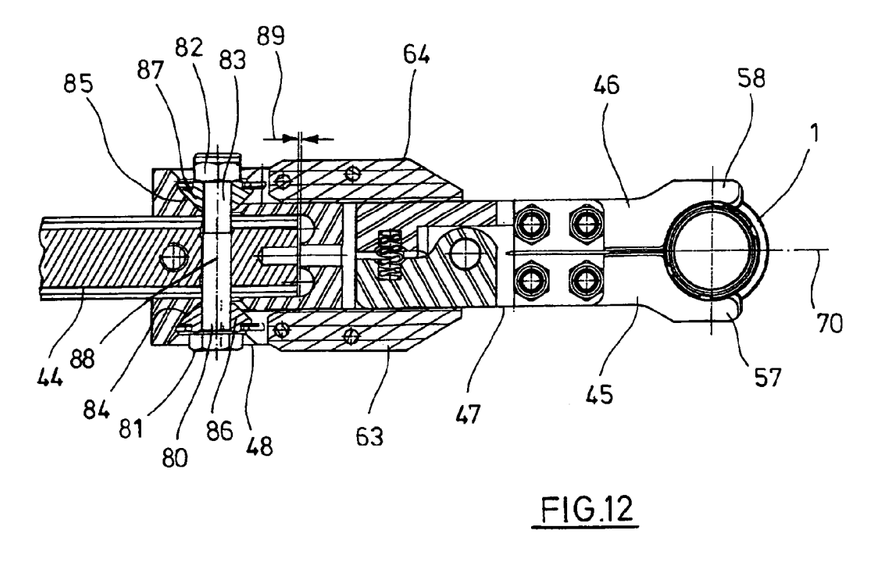
FIG. 12 a horizontal sectional view of the arrangement according to FIG. 9.

FIG. 12 shows the arrangement according to FIG. 9 in a state which is not completely mounted. Mounting takes place in such a way that as a rule the tong base 47 is already pre-assembled on the base element 48, and that in a final assembly step the base element 48 is connected to a carrier arm 44. For ensuring an optimum function, it is required that the base element 48 is fastened without play on the carrier arm 44. In this connection, it is to be desired that this assembly without play is achieved with an assembly operation which is as inexpensive as possible and with simple mechanical means.

In accordance with the embodiment in FIG. 6 to FIG. 12, this is achieved by connecting the base element 48 to the carrier arm 44 by a single, specially guided bolt 80. The bolt 80 has a bolt head 81 and a nut 82 is screwed onto an external thread of the bolt 80. In a mounted state, the bolt 80 is guided through a recess 83 of the carrier arm 44 which extends essentially transversely of the longitudinal axis 70. In the area of the base element 48, adjacent to the bolt head 81, on the one hand, and to the nut 82 on the other hand, two truncated cone-like recesses 84, 85 are arranged which narrow in the direction toward the carrier arm 44. Placed in the recesses 84, 85 are truncated cone-like centering elements 86, 87 through which the bolt 80 extends. The bolt 80 has a longitudinal axis 88.

The bolt 80 is guided through the recess 83 essentially with a precise fit, so that the longitudinal axis 88 of the bolt and a longitudinal axis of the recess 83 extend essentially identically. A longitudinal axis of the recesses 84, 85, on the other hand, is laterally offset relative to the longitudinal axis 88 of the bolt. At least in a not fully assembled state, this results in a space between the longitudinal axes of the recesses 84, 85 and the longitudinal axis 88 of the bolt. The longitudinal axes of the recesses 84, 85 extend in the plane of the drawing according to FIG. 12 on a side relative to the longitudinal axis 88 facing away from the tong base 47.

When the bolt 80 is tightened, the centering elements 86, 87 are tensioned in the direction toward the carrier arm 44 and, because of the asymmetrical arrangement of the base element 48, pull the base element 48 against the carrier arm 44. Ideally, an initially existing spacing 89 is thereby reduced to a value 0.

Next to the above explained use of the manipulating element 43 in the area of a transfer wheel 41 of a blow molding machine, a variety of other applications are also conceivable. For example, in the field of blow molding machines, the preforms 1 may be held in the area of the heating section 24 by such manipulating elements 43. Also, a use in the area of the blow molding wheel 25 is also possible. Moreover, applications in the field of filling machines are being considered.

Basically, the explained manipulating elements 43 can be used everywhere a stationary or dynamic support of workpieces is required. Consequently, the use is not limited to the embodiments explained in detail above.

The invention claimed is:

1. A device for supporting workpieces, comprising: a tong base; two tong arms supported by the tong base so as to be arrangeable in at least an opening position and a closing position; a base element, the tong base being held by the base element so that the tong base is released starting at a predetermined adjusting force and is at least over portions arranged so as to be pivotable relative to the base element; two moveable counter elements, a first of the counter elements being arranged adjacent to a first of two side surfaces of the tong base and a second of the counter elements being arranged adjacent to a second of the two side surfaces of the tong base; and at least one spring arranged at each of the counter elements to hold the counter elements in a basic position substantially parallel to the side surfaces, wherein the counter elements are a ranged so as to be pivotabie relative to the base element.

2. The device according to claim 1, wherein the spring is a compression spring.

3. The device according to claim 1, wherein the spring is a tension spring.

4. The device according to claim 1, wherein the spring is arranged with a longitudinal axis substantially transversely relative to a longitudinal axis of the base element.

5. The device according to claim 1, wherein the side surfaces are substantially planar.

6. The device according to claim 1, wherein the side surfaces extend essentially parallel to each other.

7. The device according to claim 1, wherein the counter elements have ends that extend starting from the base element in a direction of the longitudinal axis at most up to a plane that extends through a center line of an axis of rotation of the tong arms.

8. The device according to claim 1, wherein the base element is arranged so as to be tensioned against a reference surface of a carrier arm.

9. The device according to claim 1, wherein the tong arms are arranged tensioned relative to each other by at least one spring.

* * * * *